(12) United States Patent
Glaeser et al.

(10) Patent No.: US 12,479,426 B2
(45) Date of Patent: Nov. 25, 2025

(54) METHOD FOR TRAINING AND OPERATING MOVEMENT ESTIMATION OF OBJECTS

(71) Applicant: Robert Bosch GmbH, Stuttgart (DE)

(72) Inventors: Claudius Glaeser, Ditzingen (DE); Fabian Timm, Renningen (DE); Florian Drews, Renningen (DE); Michael Ulrich, Stuttgart (DE); Florian Faion, Staufen (DE); Lars Rosenbaum, Lahntal (DE)

(73) Assignee: Robert Bosch GmbH, Stuttgart (DE)

( * ) Notice: Subject to any disclaimer, the term of this patent is extended or adjusted under 35 U.S.C. 154(b) by 316 days.

(21) Appl. No.: 18/337,111

(22) Filed: Jun. 19, 2023

(65) Prior Publication Data
US 2023/0406298 A1 Dec. 21, 2023

(30) Foreign Application Priority Data
Jun. 20, 2022 (DE) ................. 10 2022 206 130.6

(51) Int. Cl.
*B60W 30/095* (2012.01)
*B60W 10/04* (2006.01)
*B60W 10/18* (2012.01)
*G05B 13/02* (2006.01)

(52) U.S. Cl.
CPC ........ *B60W 30/0956* (2013.01); *B60W 10/04* (2013.01); *B60W 10/18* (2013.01);
(Continued)

(58) Field of Classification Search
CPC ............. B60W 10/04; B60W 10/18; B60W 2420/403; B60W 2420/408;
(Continued)

(56) References Cited

U.S. PATENT DOCUMENTS 9,939,817 B1 * 4/2018 Kentley-Klay ........ B60N 2/003
11,623,658 B1 * 4/2023 Charland ............. G01S 17/931
701/23
(Continued)

FOREIGN PATENT DOCUMENTS

EP 3822138 B1 * 6/2024 ............ B60W 10/20
WO WO-2016156236 A1 * 10/2016 ............. G08G 1/166

*Primary Examiner* — Babar Sarwar
(74) *Attorney, Agent, or Firm* — Maginot, Moore & Beck LLP

(57) ABSTRACT

Learning extraction of movement information from sensor data includes providing a time series of frames of sensor data recorded by physical observation of an object, providing a time series of object boundary boxes each encompassing the object in sensor data frames, supplying the object boundary box at a time t, as well as a history of sensor data from the sensor data time series, and/or a history of object boundary boxes from the time series of object boundary boxes, prior to time t to a trainable machine learning model which predicts an object boundary box for a time t+k, comparing the predicted object boundary box with a comparison box obtained from the time series of object boundary boxes for the time t+k, evaluating a deviation between the predicted object boundary box and the comparison box using a predetermined cost function, and optimizing parameters which characterize the behavior of the model.

15 Claims, 2 Drawing Sheets

(52) U.S. Cl.
CPC ... *G05B 13/0265* (2013.01); *B60W 2420/403* (2013.01); *B60W 2420/408* (2024.01); *B60W 2420/54* (2013.01); *B60W 2554/4042* (2020.02); *B60W 2554/4044* (2020.02); *B60W 2556/10* (2020.02); *B60W 2710/18* (2013.01); *B60W 2720/10* (2013.01); *B60W 2720/106* (2013.01)

(58) Field of Classification Search
CPC ..... B60W 2420/54; B60W 2554/4042; B60W 2554/4044; B60W 2556/10; B60W 2710/18; B60W 2720/10; B60W 2720/106; B60W 30/0956; G01S 13/58; G01S 13/726; G01S 13/862; G01S 13/865; G01S 13/867; G01S 13/931; G01S 7/415; G01S 7/417; G05B 13/0265
See application file for complete search history.

(56) References Cited

U.S. PATENT DOCUMENTS

| | | | |
|---|---|---|---|
| 11,827,214 B2* | 11/2023 | Amirloo Abolfathi | B60W 60/00276 |
| 11,884,273 B2* | 1/2024 | Uemura | B62D 15/025 |
| 11,893,496 B2* | 2/2024 | Nguyen | G06N 20/00 |
| 12,012,108 B1* | 6/2024 | Pronovost | B60W 50/0098 |
| 12,236,689 B2* | 2/2025 | Musk | G06V 10/803 |
| 2009/0312985 A1* | 12/2009 | Eliazar | G01S 13/58 702/187 |
| 2017/0278303 A1* | 9/2017 | Groh | G06T 15/205 |
| 2018/0065630 A1* | 3/2018 | Tamura | G08G 1/22 |
| 2019/0361449 A1* | 11/2019 | Ueno | G05D 1/0212 |
| 2019/0392242 A1* | 12/2019 | Tariq | G06V 20/58 |
| 2020/0047746 A1* | 2/2020 | Ji | B60W 10/18 |
| 2020/0159225 A1* | 5/2020 | Zeng | G05D 1/0088 |
| 2020/0209858 A1* | 7/2020 | Trofymov | G06N 3/08 |
| 2020/0272148 A1* | 8/2020 | Karasev | G01S 13/726 |
| 2020/0369296 A1* | 11/2020 | Kim | B60W 60/0027 |
| 2020/0387156 A1* | 12/2020 | Xu | G05D 1/0212 |
| 2022/0297688 A1* | 9/2022 | Park | G01S 15/931 |
| 2022/0413502 A1* | 12/2022 | Keski-Valkama | G05D 1/0214 |
| 2023/0138325 A1* | 5/2023 | Willoughby | B60W 60/00274 701/26 |
| 2023/0242133 A1* | 8/2023 | Herman | G01S 7/4972 701/33.1 |
| 2023/0368660 A1* | 11/2023 | Ghafarianzadeh | G08G 1/0145 |

* cited by examiner

METHOD FOR TRAINING AND OPERATING MOVEMENT ESTIMATION OF OBJECTS

This application claims priority under 35 U.S.C. § 119 to patent application no. 10 2022 206 130.6, filed on Jun. 20, 2022 in Germany, the disclosure of which is incorporated herein by reference in its entirety.

The present disclosure relates to a method for learning the extraction of movement information from sensor data for subsequent application in determining velocities of detected objects. The present disclosure also relates to a method for extracting movement information from sensor data and thereby the aforementioned application in determining velocities of detected objects. The disclosure also relates to a computer program which implements one of the aforementioned methods, a machine-readable data storage medium having such a computer program, and one or more computers comprising the aforementioned computer program.

BACKGROUND

A comprehensive detection of the vehicle environment forms the basis for driver assistance systems and automated driving functions. Detection, classification, and tracking—i.e., tracking—of objects, such as other road users, is of particular importance. Nowadays, a variety of sensors may be employed to sense the vehicle environment.

Machine learning methods, especially deep learning, for example, are increasingly gaining importance in the area of automated driving. For example, deep neural networks are increasingly used in the field of environment sensing, using sensors installed in the vehicle. Some of these methods combine different sensor modalities to detect objects in the vehicle environment or to semantically segment the traffic scene.

Object detection networks configured to detect objects in the vehicle environment or for semantic segmentation of a traffic scene are typically trained by supervised learning, i.e., based on annotated environmental data. However, the creation and in particular the annotation of corresponding data sets is very time-intensive and costly. The vast majority of such datasets include annotations for object boundary boxes of objects of different classes. In this context, there are typically no annotations for the movement of the objects, i.e., for velocities of the objects, for example.

SUMMARY

Knowledge of velocities of different objects sensed in the vicinity of a vehicle is of tremendous importance in the context of autonomous driving as well as assistance-based driving, since safety-relevant and/or safety-critical actions such as braking or evasive maneuvers may need to be initiated in response to determined movements of objects close to the vehicle. Methods exist by which extraction of object parameters such as length, width, and/or object orientation from sensor data can be learned. Sensor data relating to a common measurement time may be used for this purpose. Extraction of velocity information from objects from the same sensor data is more challenging in this regard, since consideration of a temporal evolution in the sensor data is necessary.

In the context of the disclosure, a method for learning the extraction of movement information from sensor data has been developed. This method is directed to a subsequent application in determining velocities of detected objects.

The method for learning the extraction of movement information from sensor data comprises at least the steps described below. In one method step, a sensor data time series of frames is provided, the frames having been recorded by physical observation of at least one object. Furthermore, in a following step, a time series of object boundary boxes is provided. In so doing, the object boundary boxes encompass each of the at least one object in sensor data frames. In a following method step, at least the object boundary box at a time t, as well as a history of sensor data from the sensor data time series, and/or a history of object boundary boxes from the time series of object boundary boxes prior to the time t, is provided to a machine learning model. The aforementioned machine learning model is configured to predict the evolution of the object boundary box for a time t+k. The object boundary box for the time t+k, which is subsequently predicted by the machine learning model, is then compared with a comparison box obtained from the time series of object boundary boxes for the same time t+k. In a following method step, a deviation between the predicted object boundary box and the comparison box is evaluated using a predetermined cost function. Then, parameters that characterize the behavior of the trainable machine learning model are optimized. This is done with the goal that the evaluation by the aforementioned cost function is expected to improve in further predictions of object boundary boxes by the machine learning model.

In the context discussed herein, a frame comprises data—such as sensor data—that relate to a common time, e.g., a common measurement time.

At least a portion of the aforementioned object boundary boxes may be indicated in the form of annotations, for example. Movement information need not necessarily be annotated. Typically available data sets having object boundary boxes are sufficient. If the object boundary boxes are provided in the form of annotations, the fact that velocity information need not be annotated already contributes to significant time and cost savings. It is also further possible that part or all of the object boundary boxes are determined by viewing a respective sensor data frame and extracting object parameters from the respective sensor data, for example by using an object detector. In this case, even the need to provide annotated data is eliminated and work is done directly with available, non-annotated sensor data. Again, this may contribute to a significant reduction in time and money spent in training a machine learning model.

The method described above and below allows movement information to be extracted from the sensor data, wherein the movement information sometimes cannot be directly sensed or measured by environmental sensors, for example. For example, direct velocity measurements may occur based on measurements from radar sensors, in which case only a radial velocity component of a direct measurement is generally accessible. However, a 2D velocity or also a yaw rate may be of importance in connection with precise environmental sensing, including the movement predictions of objects, in order to avoid collisions, etc. by initiating appropriate (safety) actions early on. By combining existing methods for determining velocity with the method proposed herein, the overall motion estimation of objects can be improved and made more robust. This is particularly advantageous in the case of object tracking, and thus allows a more accurate and improved sensing of the environment.

According to one exemplary embodiment, at least a portion of the object boundary boxes in the time series is determined by an object detector, namely by drawing on respective time-corresponding sensor data frames. Accordingly, in this latter case, it is at least the case that not all of the object boundary boxes are present in the form of already annotated data. Rather, it is included in the method itself that at least a portion of the object boundary boxes is determined from corresponding sensor data frames. This allows a corresponding cost expenditure in connection with the creation of annotations to at least be reduced.

In accordance with one exemplary embodiment, the machine learning model predicts the time evolution of the object boundary box using at least one physical movement model.

For example, the aforementioned physical movement model can rely on at least one of the assumptions of a constant velocity, a constant velocity and a direction of travel, and/or a constant velocity and a rotation rate.

Furthermore, it is possible that information about, for example, the movement of the vehicle accommodating the sensor, i.e., the vehicle on which the sensors may be installed, said information being provided by the viewed sensor data, respectively, is used to perform ego motion compensation.

According to one exemplary embodiment, the sensor data includes radar, LiDAR, camera, and/or ultrasonic sensor data. In the case of LiDAR sensor data, the data can be corresponding data of an FMCW LiDAR, for example. These are the types of sensors that are most commonly used for environmental monitoring of vehicles.

According to one exemplary embodiment, at least one object boundary box in the time series is annotated with at least one object parameter and/or said at least one object parameter is regressed by the object detector. In so doing, the aforementioned at least one object parameter indicates a pose, a linear velocity, a radial velocity, a radial acceleration, a two-dimensional velocity, a two-dimensional acceleration, an angular velocity, and/or a rotation rate of the object. Further, it is provided that the machine learning model receives the aforementioned object parameter as an additional input. The annotated or regression-acquired additional knowledge may then be utilized to further improve the accuracy of predicting object boundary boxes.

According to one exemplary embodiment, in addition to the features of the aforementioned embodiment, at least the following may additionally be provided. The object parameter may also be predicted by the machine learning model for the time t+k and/or determined using the object boundary box predicted by the machine learning model. A deviation between the thus obtained object parameter for the time t+k and the object parameter regressed by the object detector for the time t+k may then be evaluated using a further cost function. In response, parameters that characterize the behavior of the object detector may be optimized, specifically directed to the goal that, upon further processing of sensor data frames by the object detector, the evaluation by the aforementioned further cost function is expected to be improved. In particular, the forecasting of the object parameters can also be used, for example, to predict the future movement behavior of an object and/or the intention with which such an object is being controlled.

According to one exemplary embodiment, additional movement parameters may be estimated using sensor data relating to a plurality of reflections of sensor signals off of the respective object. This is done with the aim of obtaining velocity information beyond a radial velocity of the object. This estimate of the movement parameters may also be provided as an input to the machine learning model.

A location, i.e., a distance, an azimuth angle, as well as, optionally, an elevation, can typically be extracted from sensor data. As further attributes, a 2D velocity and/or a yaw rate may be determined from a plurality of detected (for example, radar) reflections off of the object.

According to one exemplary embodiment, additional information regarding ego motion of the sensors providing the sensor data may be utilized to perform ego motion compensation and/or to also be supplied as inputs to the machine learning model. Any such additional information may improve the accuracy with which object boundary boxes can be predicted.

According to one exemplary embodiment, an object boundary box is supplied to the trained machine learning model at a current time, and furthermore a history of sensor data and/or object boundary boxes originating from said current time. Subsequently, in a further method step, a future movement of at least one object can be predicted for later times using object boundary boxes predicted using the machine learning model. For example, the prediction obtained in this way may be utilized to align the behavior of a personal vehicle with the predicted movement.

In the aforementioned case, for example, sensor data may be selected that have been recorded by at least one sensor accommodated on or in a vehicle.

In one exemplary embodiment, the further method steps described below may be provided. In one further method step, a control signal may be generated in response to the determined prediction of future movement of the at least one object. Thereafter, in a further method step, the vehicle—which houses the sensors that provide the sensor data processed by the machine learning model—may be controlled by the control signal which causes the vehicle to brake, accelerate, continue at constant velocity, and/or to take an evasive maneuver. In this context, the prediction of object boundary boxes proposed here has the effect that the action performed by the vehicle on the basis of being controlled by the control signal has a higher probability of being appropriate to the situation sensed by the environment monitoring system.

The disclosure therefore also relates to a computer program comprising machine-readable instructions which, when executed on one or more computers, cause the computer(s) to perform one of the methods previously described and as described below. The disclosure also comprises a machine-readable data medium on which the above computer program is stored, as well as a computer equipped with the aforementioned computer program or the aforementioned machine-readable data medium.

Further measures improving the disclosure are described in more detail below on the basis of the figures, together with the description of the preferred exemplary embodiments of the disclosure.

DETAILED DESCRIPTION

Figure 1:
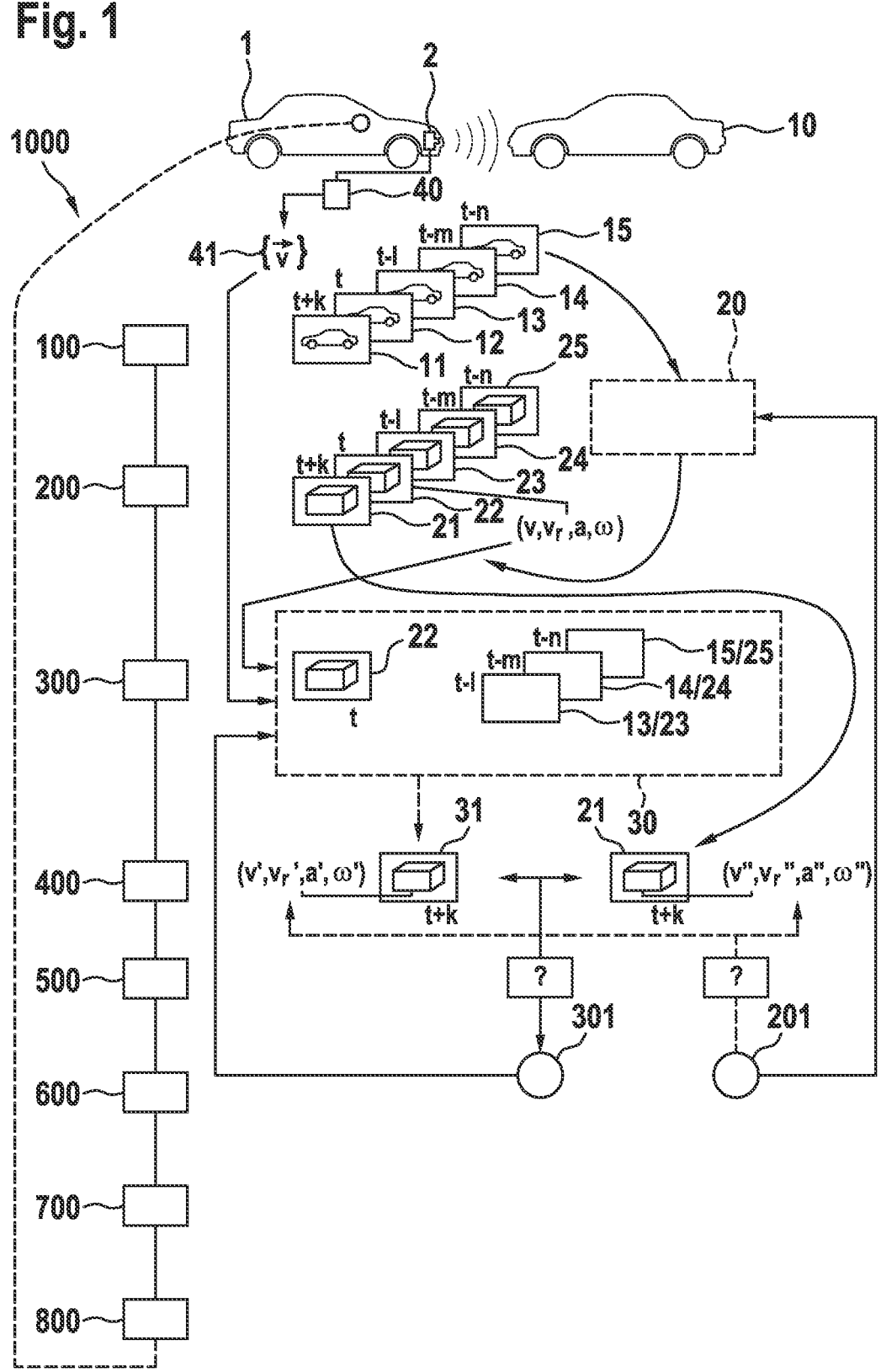
FIG. 1 an exemplary embodiment relating to a method for learning the extraction of movement information from sensor data.

FIG. 1 shows an exemplary embodiment of a method 1000 for learning the extraction of movement information from sensor data. The sensor data may include, for example, radar, LiDAR, camera, and/or ultrasonic sensor data. The learning has a subsequent application, the goal of which is to determine velocities of objects detected in the sensor data. Provided in a first method step 100, which involves the learning and training, is a time series of frames 15, 14, 13, 12, 11—in FIG. 1 relating to successive, advancing times t−n, t−m, t−1, t, and t+k. Frames 15, 14, 13, 12, and 11 were each recorded by way of physical observation of at least one object 10. The object may be a vehicle, as exemplified in FIG. 1. However, the given object can also be a pedestrian, cyclist, motorcyclist, or quad rider, i.e., in general a road user.

Then, in method step 200, a time series of object boundary boxes 25, 24, 23, 22, 21 is provided, wherein each of the aforementioned object boundary boxes encompasses the at least one object 10 in sensor data frames. Like the corresponding frames 15, 14, 13, 12, 11, the object boundary boxes 25, 24, 23, 22, 21 in FIG. 1 refer to successive, advancing times t−n, t−m, t−1, t, and t+k. For example, it is possible for at least a portion of the object boundary boxes 25, 24, 23, 22, 21 in the time series to be determined by an object detector 20 from the respective time-corresponding sensor data frames 15, 14, 13, 12, 11. For example, the frames in which the object boundary boxes 25, 24, 23, 22, 21 occur may thus particularly coincide with the frames 15, 14, 13, 12, and 11. However, compared to frames 15, 14, 13, 12, and 11, the frames containing the object boundary boxes 25, 24, 23, 22, and 21 can also be simplified, for example, i.e., they can display areas recognized as background areas or as being irrelevant for the task to be processed as blurred out, or distinctly colored. However, for the method described above and below, the presence of an object detector 20 is optional and not necessary. An object detector 20 may be used to determine at least a portion of the object boundary boxes 25, 24, 23, 22, 21 from the respective time-corresponding sensor data frames 15, 14, 13, 12, 11. However, the object boundary boxes as well as the frames containing them need not have been determined by an object detector in the course of the method described herein. This may also have taken place, for example, before the start of the method described herein.

Then, in a method step 300, a trainable machine learning model 30 which predicts the time evolution of object boundary boxes, is supplied with at least one object boundary box 22 corresponding to a time t. Furthermore, a history of sensor data 15, 14, 13 corresponding to times t−n, t−m, t−1 prior to time t, and/or a history of object boundary boxes 25, 24, 23—also corresponding to times t−n, t−m, t−1 prior to time t—is also supplied to machine learning model 30 from the time series of object boundary boxes 25, 24, 23, 22, 21. Using the supplied information—sensor data and/or object boundary boxes—the machine learning model predicts how the object boundary box 22 will have evolved at time t+k; i.e., a prediction of an object boundary box 31 for the time t+k is given. This prediction can be made by the machine learning model 30, for example, in particular by using at least one physical movement model. For example, the aforementioned movement model can rely on at least one of the assumptions of a constant velocity, a constant velocity and direction of travel, and/or a constant velocity and rotation rate.

For example, it is further possible for at least one of the object boundary boxes 25, 24, 23, and 22 in the time series to be annotated with at least one object parameter (v; $v_r$; a; ω) and/or for this object parameter to be regressed by the object detector—if present—using at least one of the sensor data frames 15, 14, 13, 12. In the process, the aforementioned object parameter may indicate a pose, linear velocity, radial velocity, radial acceleration, two-dimensional velocity, two-dimensional acceleration, angular velocity, and/or rotation rate of the object. The object parameter (v; $v_r$; a; ω) may be provided to the machine learning model 30, in particular as an additional input.

In the following method step 400, the aforementioned predicted object boundary box 31 is subsequently compared with an object boundary box 21 which is obtained from the time series of object boundary boxes 25, 24, 23, 22, 21 and which refers to the same time t+k. In method step 500, a deviation between the predicted object boundary box 31 and the comparison box 21 is evaluated using a predetermined cost function. Subsequently, in step 600, parameters 301, which characterize the behavior of the trainable machine learning model 30, are optimized with the goal that in the further prediction of object boundary boxes, the evaluation by the aforementioned cost function is expected to improve analogous to the prediction of the object boundary box 31.

If an object parameter (v; $v_r$; a; ω) has been given as annotation or has previously been regressed as part of the method, then a corresponding object parameter (v'; $v_r$'; a'; ω') for the time t+k can also be predicted by the machine learning model 30 and/or determined by using the object boundary box 31 predicted by the machine learning model 30 (v''; $v_r$''; a''; ω''). Then, a deviation between the predicted object parameter (v'; $v_r$'; a'; ω') for the time t+k and the object parameter (v''; $v_r$''; a''; ω'') regressed by the object detector for the time t+k may be evaluated using a further cost function. Optimization of parameters 201, which characterize the behavior of object detector 20, may then be performed. The goal of the optimization is that in further processing of frames 15, 14, 13, 12, 11 of sensor data by the object detector 20, the evaluation is expected to be improved by this further cost function.

As shown in FIG. 1, additional movement parameters 41 relating to a plurality of reflections of sensor signals off of the respective object 10 may be optionally estimated using sensor data 40. For example, a distance, an azimuth angle, optionally an elevation, as well as a radial velocity of an object can typically be determined from (radar) sensor signals. A 2D velocity and/or a yaw rate may additionally be determined or estimated from a plurality of, for example, radar sensor signals off of an object 10. In this context, the goal is to obtain velocity information beyond a radial velocity of the object 10. For example, the corresponding estimate of the movement parameters 41 may also be provided as input to the machine learning model 30.

Additional information on ego motion of the sensors 2 supplying the sensor data, for example in FIG. 1 the vehicle which houses the sensor 2, can, for example, be used to perform ego motion compensation and/or can also be supplied as inputs to the machine learning model 30.

By means of the exemplary embodiment shown in FIG. 1, it can also be understood what steps for the extraction of movement information look like using the already trained machine learning model 30. To this end, an object boundary box 22 is supplied to the trained machine learning model 30 at a current time (shown in FIG. 1: the time t), as well as a history of sensor data 13, 14, 15, and/or object boundary boxes 23, 24, 25 originating from that current time. Using object boundary boxes 31 predicted by the trained machine learning model 30, a future movement of at least one object 10 is predicted for later times (in Fig.: time t+k). In this regard, typical sensor data are selected from the applied extraction of movement information, the data having been recorded by at least one sensor 2 carried on or in a vehicle 1. The method proposed here improves and thus expands environmental sensing by a semi-autonomous or driver assistance-based vehicle.

Thus, for example, further method steps 700 and 800 may be provided in the aforementioned context. In step 700, a control signal is determined in response to the determined prediction for future movement of the at least one object 10. Then, in step 800, the vehicle 1 is controlled by the control signal which causes the vehicle 1 to brake, accelerate, continue at constant velocity, and/or take an evasive maneuver.

Figure 2:
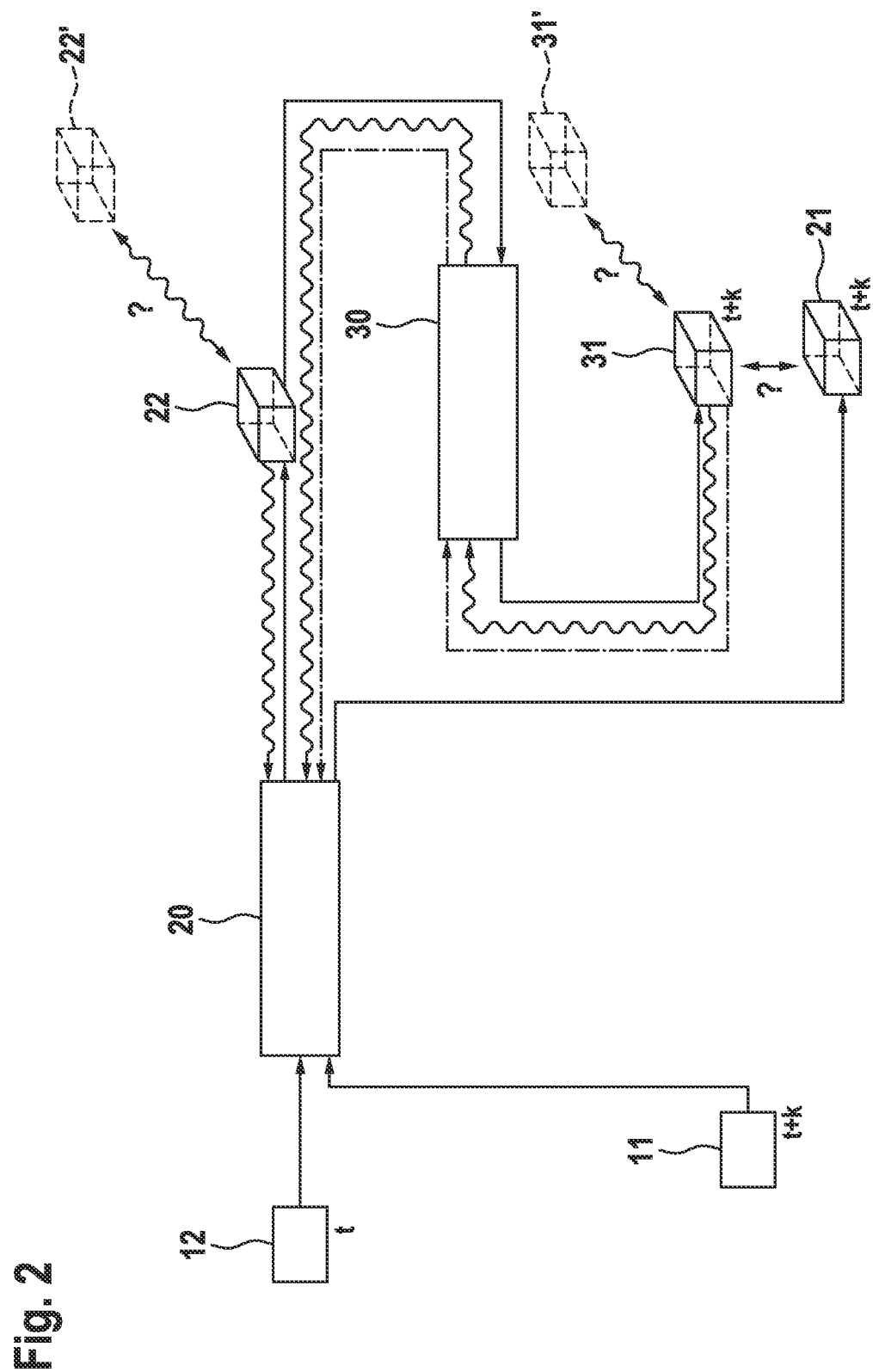
FIG. 2 a further exemplary embodiment with respect to the method for learning the extraction of movement information.

FIG. 2 shows some exemplary aspects of an embodiment of the method presented herein. A sensor data frame 12 at time t is supplied to an object detector 20 here. The detector detects an object O in the sensor data 12 and encompasses this object using an object boundary box 22 corresponding to the time t. A machine learning model 30 having a corresponding transformation module converts the object boundary box 22 into an object boundary box 31. This may be done—as already described above—based on estimated movement parameters and/or physical motion models. The object boundary box 31 is subsequently compared to, for example, an object boundary box 21. The latter object boundary box 21 encompasses the object O in sensor data, which relate to the time t+k. In particular, sensor data 11, which relate to the time t+k, were supplied to an object detector 20 which detects in this data the same object O and encompasses the object accordingly using the object boundary box 21. The deviations between the object boundary boxes 31 and 21 can be evaluated using a cost function and parameters of the machine learning model 30 can be optimized based on said evaluation, the goal of which being that a re-evaluation using the cost function is expected to improve. This is indicated in FIG. 2 by the dotted-dashed line pointing to the machine learning model 30. Additionally, or alternatively, to compare the object boundary boxes 31 and 21, a comparison between the object boundary boxes 31 and 31' may be performed and evaluated using a further cost function. Object boundary box 31' is an annotation. Based on the aforementioned evaluation, parameters of the machine learning model 30 and/or the object detector may be optimized, the goal being that a re-evaluation using the further cost function is expected to improve. This is indicated in FIG. 2 by the wavy line pointing to the machine learning model 30 and the object detector 20. It is further indicated in FIG. 2 that in order to improve the object detector 20, in addition to the aforementioned optimization options, a comparison between the object boundary box 20 at the time t and a corresponding annotation 22' can also be carried out and parameters of the object detector 20 can be adjusted based on the evaluation of the comparison.

We claim:

1. A method for training a machine learning model to predict motion of a detected object, the method comprising:
providing a time series of frames of first sensor data recorded by physical observation of at least one object;
providing a time series of first object boundary boxes encompassing the at least one object in the time series of frames of the first sensor data; and
training the machine learning model to predict motion of the at least one object using the time series of frames of the first sensor data and the time series of the first object boundary boxes as training data, the training comprising:
determining, using the machine learning model, a predicted object boundary box for a time "t+k" based on (i) the object boundary box at a time "t" and (ii) a first history of sensor data from the time series of frames of the first sensor data prior to the time "t" and/or a first history of object boundary boxes from the time series of the first object boundary boxes prior to the time "t", where is the time "t+k" is after the time "t";
comparing the predicted object boundary box with a comparison object boundary box obtained from the time series of the first object boundary boxes at the time "t+k";
evaluating a deviation between the predicted object boundary box and the comparison object boundary box using a predetermined cost function; and
optimizing parameters which characterize a behavior of the machine learning model based on the deviation.

2. The method according to claim 1, wherein at least a portion of the first object boundary boxes in the time series of the first object boundary boxes is determined by an object detector from a respective time-corresponding frame from the time series of frames of the first sensor data.

3. The method according to claim 1, wherein the machine learning model determines the predicted object boundary box using at least one physical movement model.

4. The method according to claim 3, wherein the physical movement model relies on at least one of an assumption of a constant velocity, a constant velocity and a direction of travel, and a constant velocity and rate of rotation.

5. The method according to claim 1, wherein the time series of frames of the first sensor data includes radar, LiDAR, camera, and/or ultrasonic sensor data.

6. The method according to claim 1, wherein:
at least one object boundary box in the time series of the first object boundary boxes is annotated with at least one object parameter indicative of a pose, linear velocity, radial velocity, radial acceleration, two-dimensional velocity, two-dimensional acceleration, angular velocity, and/or rotational rate of the object, and/or said object parameter is regressed by an object detector; and
the machine learning model receives the at least one object parameter as an additional input.

7. The method according to claim 6, wherein:
a predicted object parameter for the time "t+k" is determined using the machine learning model and/or is determined using the predicted object boundary box determined by the machine learning model;
evaluating a further deviation between the predicted object parameter for the time "t+k" and the object parameter regressed by the object detector at the time "t+k" using a further cost function; and
optimizing the parameters that characterize the behavior of the object detector based on the further deviation.

8. The method according to claim 1, wherein:
additional movement parameters are estimated using sensor data including a plurality of reflections of sensor signals off of the respective object, such that velocity information beyond a radial velocity of the object is obtained; and
the machine learning model receives the additional movement parameters as input to the machine learning model.

9. The method according to claim 1, wherein additional information regarding ego motion of sensors that measured the time series of frames of the first sensor data are used to perform ego motion compensation, and/or are supplied to the machine learning model as inputs.

10. The method according to claim 1, further comprising, after the training the machine learning model:

supplying an object boundary box to the machine learning model at a current time along with at least one of a second history of sensor data from a time series of frames of second sensor data prior to the current time and a second history of object boundary boxes from a time series of second object boundary boxes prior to the current time; and determining, using object boundary boxes predicted using the machine learning model, a predicted future movement of at least one object.

11. The method according to claim 10, wherein the second history of sensor data prior to the current time are recorded by at least one sensor accommodated on or included in a vehicle.

12. The method according to claim 11, further comprising:

generating a control signal based on the predicted future movement of the at least one object; and controlling the vehicle using the control signal so as to cause the vehicle to brake, accelerate, continue at constant velocity, and/or take an evasive maneuver.

13. The method according to claim 1, wherein the method is implemented by a computer that executes a computer program.

14. A non-transitory machine-readable data storage medium that stores a computer program having instructions that, when executed on a computer, cause the computer to perform the method according to claim 1.

15. A computer comprising:

at least one memory; and at least one processor operably connected to the at least one memory, the at least one processor being configured to execute instructions of a computer program to perform the method according to claim 1.

* * * * *